US012653197B2

(12) United States Patent
Elayedath et al.

(10) Patent No.: US 12,653,197 B2
(45) Date of Patent: *Jun. 16, 2026

(54) HARD TACO SHELL AND METHOD AND APPARATUS FOR PRODUCING THE HARD TACO SHELL

(71) Applicant: General Mills, Inc., Minneapolis, MN (US)

(72) Inventors: Shivakumar Elayedath, Eden Prairie, MN (US); John J Fenske, Shoreview, MN (US); Sean Igo, Minnetonka, MN (US); Andrew David King, St Neots (GB); David Morrison Russell, Sheffield (GB); Samuel Whitmore, Cambridge (GB); Mark Anthony Zentile, Heidelberg (DE)

(73) Assignee: General Mills, Inc., Minneapolis, MN (US)

( * ) Notice: Subject to any disclaimer, the term of this patent is extended or adjusted under 35 U.S.C. 154(b) by 551 days.

This patent is subject to a terminal disclaimer.

(21) Appl. No.: 17/565,622

(22) Filed: Dec. 30, 2021

(65) Prior Publication Data

US 2022/0117241 A1      Apr. 21, 2022

Related U.S. Application Data

(63) Continuation of application No. 16/473,481, filed as application No. PCT/US2018/039788 on Jun. 27, 2018, now Pat. No. 11,246,315.

(51) Int. Cl.
*A21C 11/04*      (2006.01)
*A21D 13/42*      (2017.01)
(52) U.S. Cl.
CPC .............. *A21C 11/04* (2013.01); *A21D 13/42* (2017.01)

(58) Field of Classification Search
None
See application file for complete search history.

(56) References Cited

U.S. PATENT DOCUMENTS 127,235   A      5/1872   Heywood
825,775   A      7/1906   Stumpf
(Continued)

FOREIGN PATENT DOCUMENTS

MX            05009227         2/2007
WO      WO 1998/019549         5/1998
WO      WO 2008/033896         3/2008

OTHER PUBLICATIONS

Mintel, *"Small Crisp Unleavened Matzo Bread with Chestnut"*, retrieved from www.gnpd.com Jun. 2013.
(Continued)

*Primary Examiner* — Erik Kashnikow
*Assistant Examiner* — Ashley Axtell
(74) *Attorney, Agent, or Firm* — Jordan IP Law, LLC; Tina Yin Sowatzke, Esq.

(57)            ABSTRACT

A taco shell is produced using a rotary cutter including a shaft, an outer blade extending radially outward from the shaft and a first inner blade extending radially outward from the shaft. The outer blade defines an interior area, enclosed by the outer blade, and an exterior area. The first inner blade is located in the interior area and includes a plurality of teeth. A dough piece is cut from a dough sheet with the outer blade, and a first arcuate line of depressions is created in the dough piece with the plurality of teeth. The dough piece is folded to form a shaped dough piece, and the shaped dough piece is baked to produce a hard taco shell.

17 Claims, 7 Drawing Sheets

(56) References Cited

U.S. PATENT DOCUMENTS

| | | | |
|---|---|---|---|
| 1,382,677 | A | 6/1921 | Schmitz |
| 1,620,153 | A | 3/1927 | Curtner |
| 1,807,009 | A | 5/1931 | Pinnelli |
| 2,007,768 | A | 7/1935 | Olevin |
| 2,144,720 | A | 1/1939 | Gibson |
| 2,284,455 | A | 5/1942 | Stauffacher |
| 2,288,970 | A | 7/1942 | Weisbender |
| 2,304,759 | A | 12/1942 | Carroll |
| 2,483,173 | A | 9/1949 | Behnke |
| 2,887,964 | A | 5/1959 | Griner |
| 3,005,260 | A | 10/1961 | Muse |
| 3,020,826 | A | 2/1962 | Silva |
| 3,186,362 | A | 6/1965 | Iannuzzi, Sr. |
| 3,225,718 | A | 12/1965 | Page |
| 3,299,835 | A | 1/1967 | Marsili |
| 3,417,713 | A | 12/1968 | Schwebel |
| 3,511,172 | A | 5/1970 | Jones |
| 3,880,030 | A | 4/1975 | Rosengren |
| 3,880,069 | A | 4/1975 | Moline |
| D240,288 | S | 6/1976 | Wright |
| 4,276,800 | A | 7/1981 | Koppa et al. |
| 4,289,470 | A | 9/1981 | Johnston et al. |
| 4,597,979 | A | 7/1986 | Goglanian |
| 4,717,328 | A | 1/1988 | D'Alterio |
| 4,780,329 | A | 10/1988 | D'Alterio |
| 4,815,859 | A | 3/1989 | Weinkle |
| 5,306,133 | A | 4/1994 | Dayley |
| 5,364,016 | A | 11/1994 | Capy et al. |
| D383,648 | S | 9/1997 | Morales |
| D391,125 | S | 2/1998 | Morales |
| 5,738,578 | A | 4/1998 | Marchese |
| D402,858 | S | 12/1998 | Iannuzzi et al. |
| 5,918,533 | A | 7/1999 | Lawrence et al. |
| 5,993,871 | A | 11/1999 | Beehler |
| 6,227,093 | B1 | 5/2001 | Rensky, Jr. |
| 6,279,443 | B1 | 8/2001 | Nakahara et al. |
| D514,899 | S | 2/2006 | Bellacicco |
| D515,368 | S | 2/2006 | Bellacicco |
| 8,513,571 | B2 | 8/2013 | Gonzalez |
| 8,622,729 | B2 | 1/2014 | Suski et al. |
| 9,044,025 | B2 | 6/2015 | Bakhoum |
| D770,243 | S | 11/2016 | Esquivel |
| 2004/0175469 | A1 | 9/2004 | Janecka |
| 2006/0233918 | A1 | 10/2006 | Jones |
| 2006/0286244 | A1 | 12/2006 | Fu et al. |
| 2007/0065528 | A1 | 3/2007 | Hernandez |
| 2010/0159095 | A1 | 6/2010 | Suski et al. |
| 2010/0173052 | A1 | 7/2010 | Suski et al. |
| 2010/0227024 | A1 | 9/2010 | Flores |
| 2012/0079933 | A1 | 4/2012 | Johansson |
| 2012/0193345 | A1 | 8/2012 | Gonzalez |
| 2014/0093624 | A1 | 4/2014 | Trevino |
| 2014/0260847 | A1 | 9/2014 | Schneider |
| 2014/0370175 | A1 | 12/2014 | Bakhoum |
| 2014/0377438 | A1 | 12/2014 | Kelly |
| 2015/0044338 | A1 | 2/2015 | Nagle et al. |
| 2017/0258098 | A1 | 9/2017 | Vogler |

OTHER PUBLICATIONS

Reddit, Retrieved from htps://www.reddit.com/r/CrazyIdeas/comments/1fjb1/hard_taco_perforated_bite_lines_so_it/, 2013.
Allan, "*The Best Way to Eat a Crunchy Taco*", Lifehacker, Jul. 26, 2017, Retrieved from URL: https://skillet.lifehacker.com/the-best-way-to-eat-a-crunchy-taco-1797265692.

HARD TACO SHELL AND METHOD AND APPARATUS FOR PRODUCING THE HARD TACO SHELL

CROSS-REFERENCE TO RELATED APPLICATIONS

This application is a continuation of U.S. patent application Ser. No. 16/473,481, filed Jun. 25, 2019, entitled "Hard Taco Shell and Method and Apparatus for Producing the Hard Taco Shell", pending, which represents a National Stage application of PCT/US2018/039788 entitled "Hard Taco Shell and Method and Apparatus for Producing the Hard Taco Shell" filed Jun. 27, 2018. The entire content of these applications are incorporated herein by reference.

BACKGROUND OF THE INVENTION

The invention pertains to the art of food production and, more particularly, to the production of hard taco shells.

Due to the time demands placed on consumers by the everyday activities of modern life, the preparation of food products and meals from scratch has decreased and the popularity of premade or partially premade foods has increased dramatically. One such product is the taco shell. A taco shell is essentially a hard, generally U-shaped tortilla designed to hold a variety of fillings. Due to the hardness of the taco shell, the placement of the fillings and the manner in which such tacos are typically eaten, taco shells tend to break other than at the exact location where bitten. This typically results in a messy eating experience in which the fillings fall out of the taco shell. Since one of the advantages of a taco is that utensils are not necessary, it would be desirable to provide a taco shell that minimizes the tendency of the fillings to fall out during consumption.

SUMMARY OF THE INVENTION

The invention achieves the above goal by providing weak points at predetermined locations in a hard taco shell. When the taco shell is bitten, it breaks at these artificial weak points rather than at the taco shell's natural weak points. The artificial weak points are located so as to reduce the degree to which fillings fall out of the taco shell (as compared with a standard taco shell).

The artificial weak points are formed in the taco shell using a rotary cutter. The rotary cutter includes a shaft and an outer blade extending radially outward from the shaft. The outer blade defines an interior area, enclosed by the outer blade, and an exterior area. The outer blade is configured to cut a dough piece from a dough sheet. The rotary cutter also includes a plurality of inner blades extending radially outward from the shaft. The inner blades are located in the interior area. Each of the inner blades includes a plurality of teeth configured to create a line of depressions in the dough piece. It is these depressions that establish the artificial weak points in the taco shell. After the dough piece is cut from the dough sheet and the depressions are formed in the dough piece, the dough piece is folded to form a U-shaped or flat bottom dough piece. The shaped dough piece is baked to produce the taco shell. The taco shell includes first and second sidewalls, and each line of depressions extends up both the first and second sidewalls.

Additional objects, features and advantages of the invention will become more readily apparent from the following detailed description of preferred embodiments thereof when taken in conjunction with the drawings wherein like reference numerals refer to common parts in the several views.

DETAILED DESCRIPTION OF THE INVENTION

Detailed embodiments of the present invention are disclosed herein. However, it is to be understood that the disclosed embodiments are merely exemplary of the invention that may be embodied in various and alternative forms. The figures are not necessarily to scale, and some features may be exaggerated or minimized to show details of particular components. Therefore, specific structural and functional details disclosed herein are not to be interpreted as limiting, but merely as a representative basis for teaching one skilled in the art to employ the present invention. Additionally, as used in connection with the present invention, terms such as "parallel" and "perpendicular" do not necessarily require, for example, that the relevant items be perfectly parallel. Instead, these terms include a margin of error of +/−5° (regardless of whether the error is by design or due to inherent manufacturing limitations) so long as the error does not prevent the present invention from functioning as intended. The modifier "substantially" increases the margin of error to +/−10°.

Figure 1:
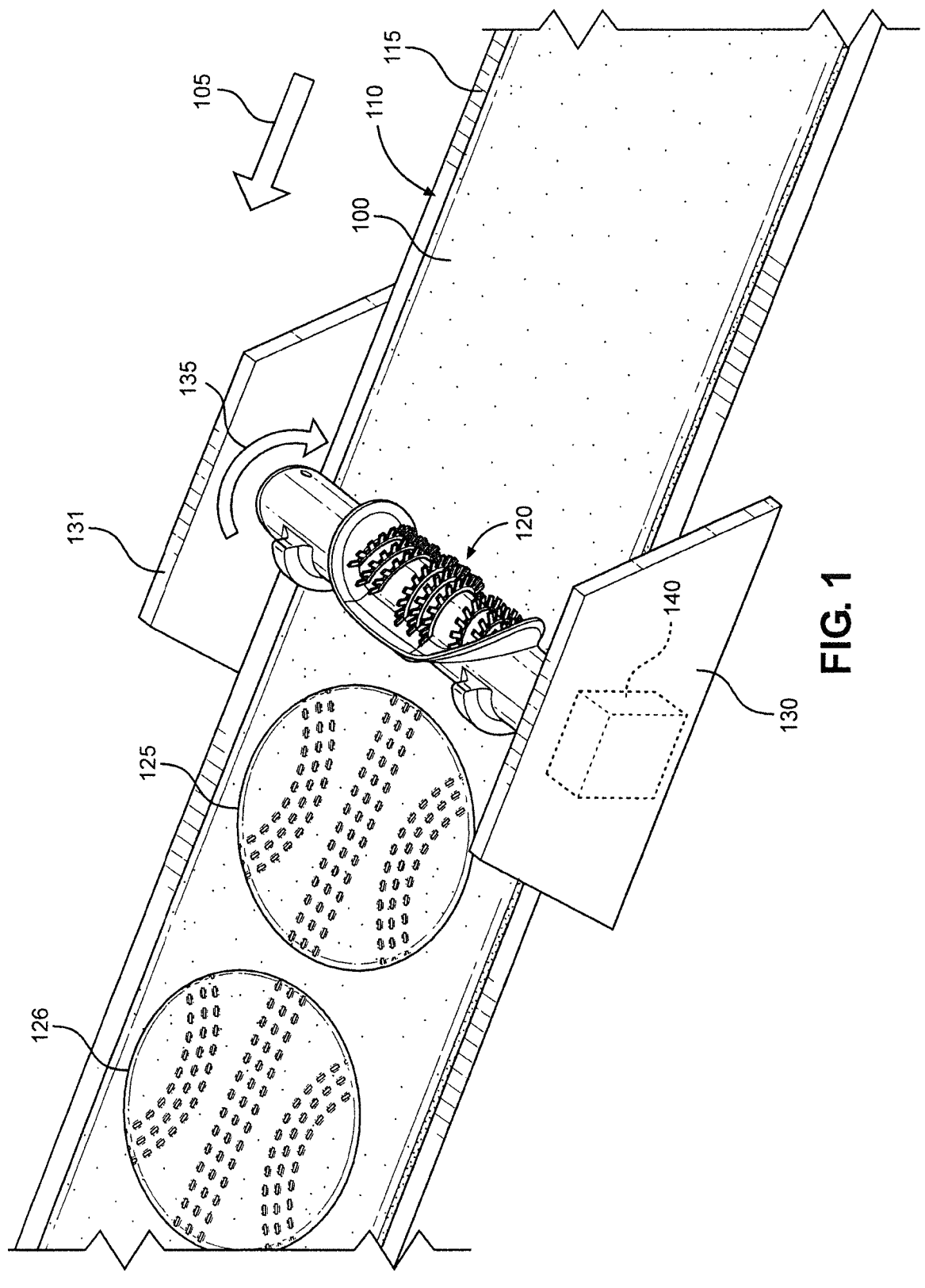
FIG. 1 is a perspective view of a portion of a production line for producing taco shells in accordance with the invention.

With initial reference to FIG. 1, there is shown a portion of a production line for producing taco shells in accordance with the present invention. Specifically, FIG. 1 shows a dough sheet 100 being transported in a direction 105 by a conveyor system 110. In the embodiment illustrated, conveyor system 110 includes a conveyor belt 115 on which dough sheet 100 is supported. However, other conveyor systems known in the art can be used with the present invention. Preferably, dough sheet 100 is made using corn flour. However, dough sheet 100 can be made using various types of flour, including wheat flour, if desired.

Dough sheet 100 passes beneath a rotary cutter 120, which is configured to repeatedly cut dough pieces from dough sheet 100 as dough sheet 100 is transported in direction 105. For example, FIG. 1 shows cut dough pieces 125 and 126. Rotary cutter 120 is supported above dough sheet 100 by supports 130 and 131. Supports 130 and 131 are located on opposite sides of conveyor belt 115, with rotary cutter 120 extending between supports 130 and 131 such that rotary cutter 120 is arranged to rotate about an axis extending perpendicular to direction 105.

Rotary cutter 120 is configured such that contact between rotary cutter 120 and dough sheet 100 or conveyor belt 115 causes rotary cutter 120 to rotate in a direction 135 as dough sheet 100 and conveyor belt 115 travel in direction 105. Alternatively, a motor and transmission (collectively labeled 140) can be provided for causing rotary cutter 120 to rotate in direction 135. In either case, each full rotation of rotary cutter 120 results in one dough piece being cut from dough sheet 100.

Figure 2:
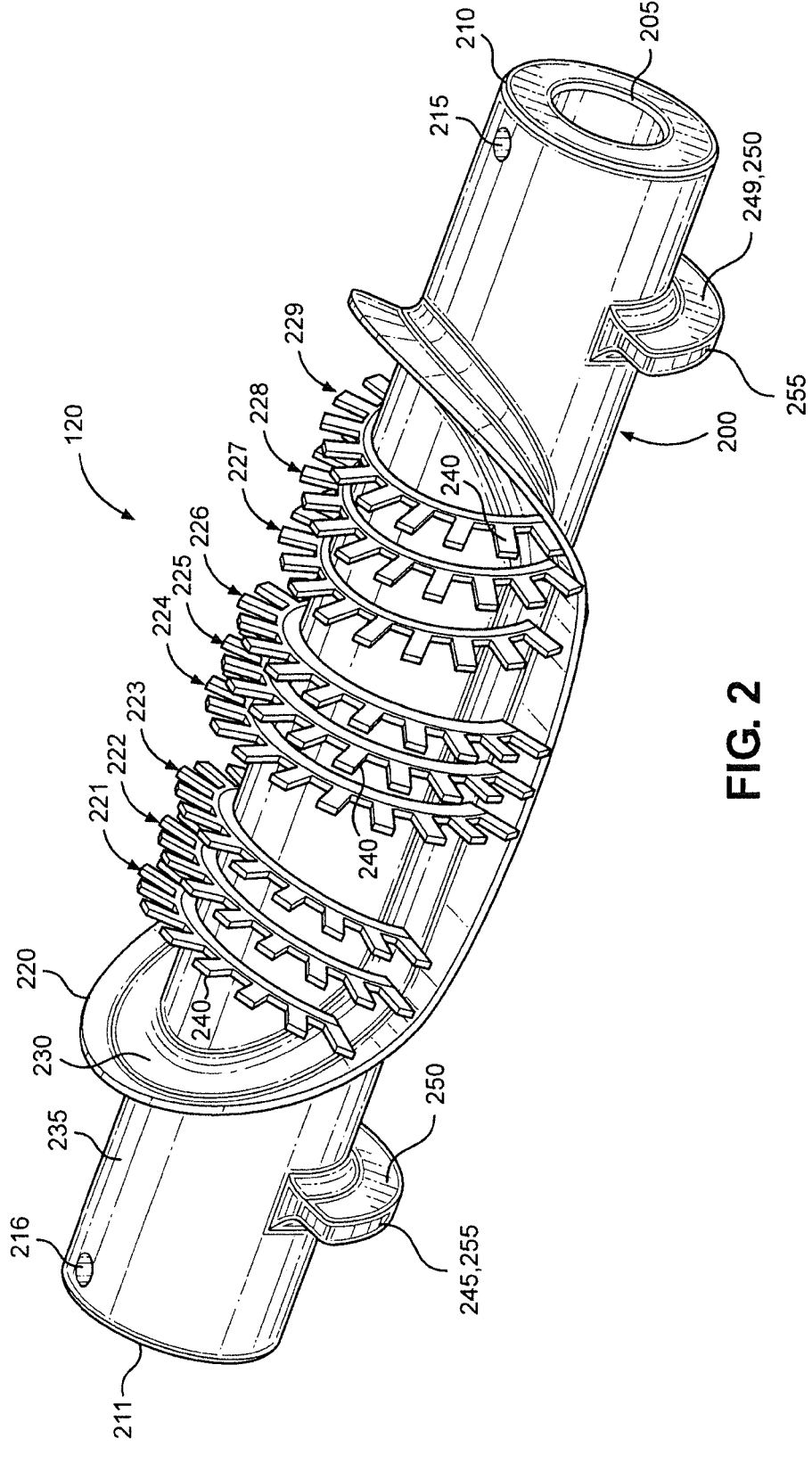
FIG. 2 is a perspective view of a rotary cutter constructed in accordance with the invention.
Figures 3, 4:
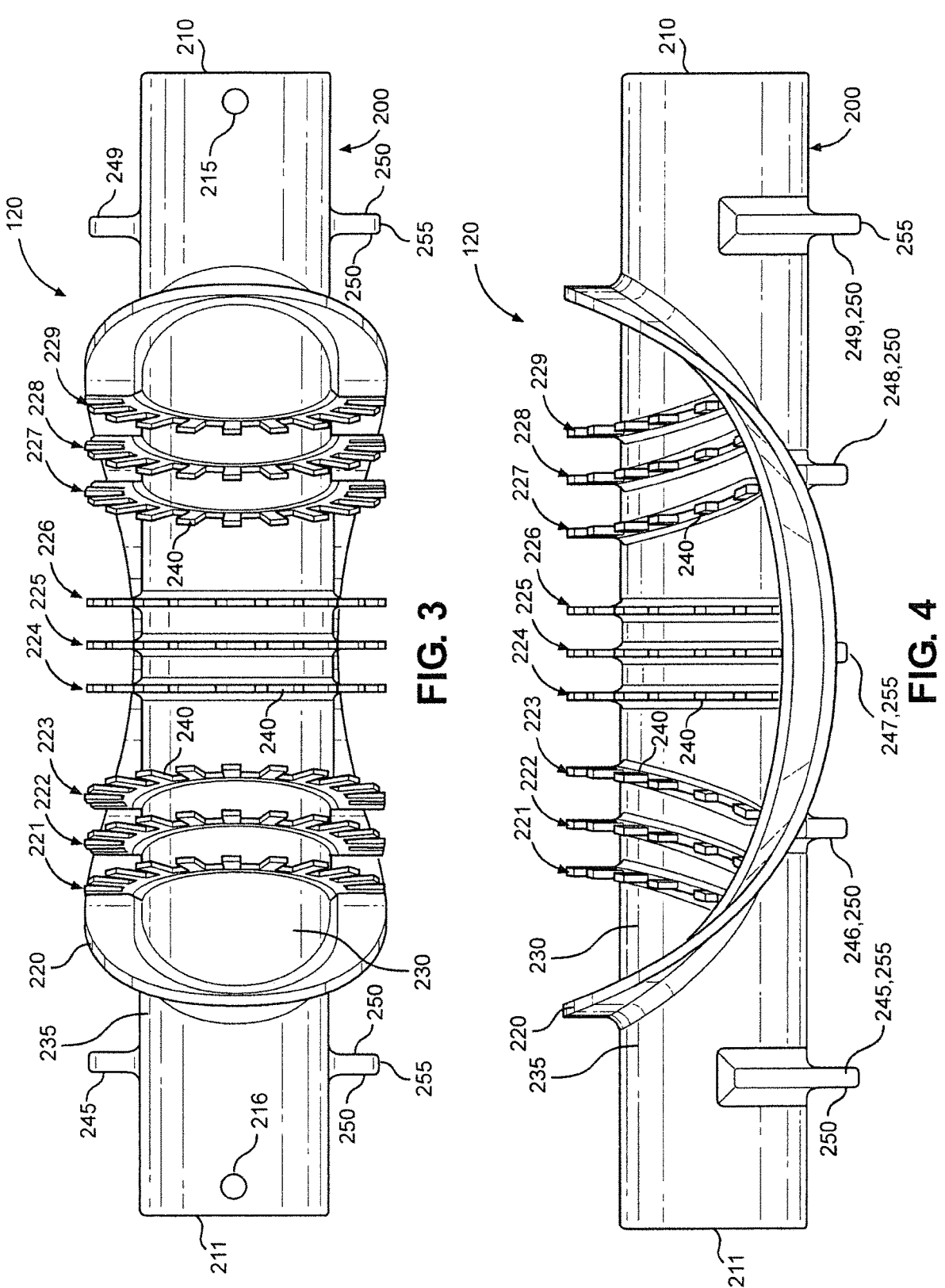
FIG. 3 is a side view of the rotary cutter.
FIG. 4 is a top view of the rotary cutter.

FIGS. 2-4 show rotary cutter 120 in more detail. Rotary cutter 120 includes a shaft 200, which is coupled to supports 130 and 131 using two holes located at opposite ends of shaft 200. In particular, shaft 200 has a first end hole 205, located at a first end 210 of shaft 200, that extends into shaft 200 in the longitudinal direction. A second end hole (not visible) is located at a second end 211 of shaft 200. The second end hole is constructed in the same manner as first end hole 205. Each of supports 130 and 131 includes a rod or other protrusion (not shown) that is configured to fit within first end hole 205 or the second end hole. At this point, rotary cutter 120 can rotate relative to supports 130 and 131. In connection with the motor driven embodiment mentioned above, after insertion of the protrusions into first end hole 205 and the second end hole, pins (not shown) are inserted through holes 215 and 216 of shaft 200 into corresponding holes formed in the protrusions, thereby removably coupling shaft 200 to motor and transmission 140. Holes 215 and 216 extend through shaft 200 in the lateral direction. Of course, other coupling mechanisms known in the art can be used to couple rotary cutter 120 while enabling rotation of shaft 200.

Rotary cutter 120 further includes a plurality of blades 220-229 extending radially outward from shaft 200. An outer blade 220 defines an interior area 230, enclosed by outer blade 220, and an exterior area 235. Inner blades 221-229 are located in interior area 230. Outer blade 220 is configured to cut dough pieces (e.g., dough pieces 125 and 126) from dough sheet 100. In other words, the location of the cut performed by outer blade 220 in dough sheet 100 corresponds to the outer perimeter of the resulting dough piece. As shown, outer blade 220 is shaped so as to cut a circular dough piece. However, in other embodiments, outer blade 220 can be shaped to cut non-circular dough pieces.

Each of inner blades 221-229 includes a plurality of teeth 240. Teeth 240 are configured to create depressions in the dough pieces being cut from dough sheet 100 by outer blade 220 at the same time that the dough pieces are being cut. Specifically, each of inner blades 221-223 and 227-229 is configured to create an arcuate line of depressions in a given dough piece, while each of inner blades 224-226 is configured to create a straight line of depressions in the dough piece. Accordingly, each dough piece cut by rotary cutter 120 includes six arcuate lines of depressions and three straight lines of depressions.

Inner blades 224-226 are located near the midpoint of shaft 200, inner blades 221-223 are located between the midpoint and end 211, and inner blades 227-229 are located between the midpoint and end 210. In particular, inner blade 225 is located at the midpoint of shaft 200, with inner blades 224 and 226 located on either side. For purposes of the present invention, "midpoint" refers to the middle point in the longitudinal direction.

With particular reference to FIGS. 3 and 4, it can be seen that, for each of inner blades 221-223, the end teeth are relative nearer to end 211, while the middle teeth are relatively nearer to the midpoint of shaft 200. Similarly, for each of inner blades 227-229, the end teeth are relatively nearer to end 210, while the middle teeth are relatively nearer to the midpoint of shaft 200. This is because each of inner blades 221-223 and 227-229 is curved in the longitudinal direction of shaft 200. (Of course, inner blades 221-223 and 227-229 are also curved around the circumference of shaft 200.) The curvature of inner blades 221-223 and 227-229 in the longitudinal direction is why the lines of depressions created by inner blades 221-223 and 227-229 are arcuate. In contrast, for each of inner blades 224-226, teeth 240 are arranged in a straight line and are therefore equidistant from ends 210 and 221, resulting in a straight line of depressions.

Rotary cutter 120 also includes a plurality of followers 245-249 located in exterior area 235, as shown in FIGS. 2-4. Followers 245-249 are configured to receive motion from conveyor belt 115, either directly (via contact between followers 245-249 and conveyor belt 115) or indirectly (via contact between followers 245-249 and dough sheet 100). Each of followers 245-249 is essentially a flange extending radially outward from shaft 200. Accordingly, each of followers 245-249 has a pair of side faces 250 and an outer face 255. It is outer faces 255 that contact conveyor belt 115 or dough sheet 100.

As discussed above, contact between rotary cutter 120 and dough sheet 100 or conveyor belt 115 causes rotary cutter 120 to rotate in direction 135 as dough sheet 100 and conveyor belt 115 travel in direction 105. Specifically, it is contact between dough sheet 100 or conveyor belt 115 and blades 220-229 or followers 245-249 that causes the rotational motion. In the embodiment shown, rotary cutter 120 only contacts dough sheet 100 during use since dough sheet 100 is wider than the spacing between followers 245 and 249. However, it should be recognized that both the width of dough sheet 100 and the spacing of followers 245 and 249 can vary. Accordingly, in some embodiments, such followers contact conveyor belt 115 during use. Followers positioned within the longitudinal portion of shaft 200 containing blades 220-229, such as followers 246-248, contact the dough sheet.

When rotary cutter 120 is in the position shown in FIGS. 2-4, dough sheet 100 contacts followers 245-249 but not blades 220-229. As dough sheet 100 travels in direction 105, dough sheet 100 pulls followers 245-249 in direction 105. Since rotary cutter 120 is mounted for rotation rather than translation, this causes rotary cutter 120 to rotate. After some rotation, dough sheet 100 ceases to contact followers 246-248 and begins to contact blades 220-229. In particular, dough sheet 100 first contacts outer blade 220 and inner blades 224-226. Continued rotation causes dough sheet 100 to cease contacting followers 245 and 249 as well. At this point, dough sheet 100 is only pulling blades 220-229 in direction 105. Eventually, dough sheet 100 begins to contact followers 245-249 once more and ceases to contact blades 220-229. This cycle repeats for each dough piece cut from dough sheet 100.

Figure 5:
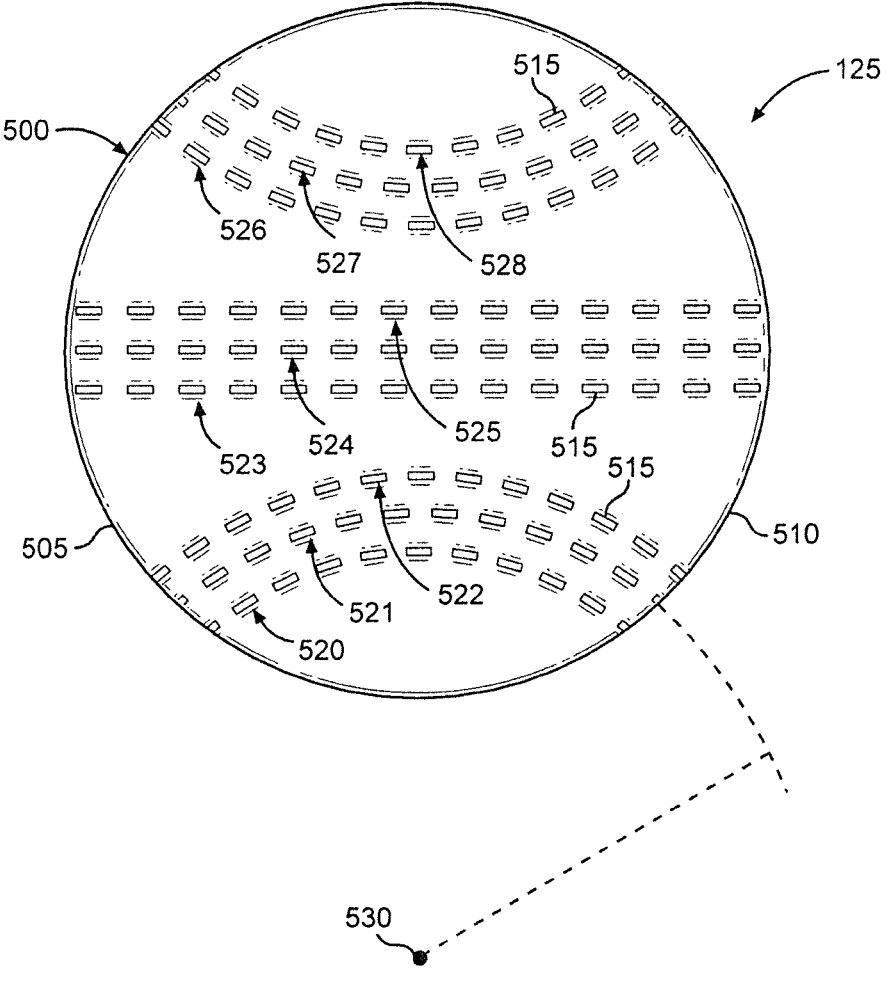
FIG. 5 is a top view of a piece of dough cut by the rotary cutter.

With reference now to FIG. 5, dough piece 125 is shown in more detail. Dough piece 125 has an outer perimeter 500, which defines a circle. However, as noted above, other shapes can be produced in accordance with the present invention. For purposes of the present invention, one half of outer perimeter 500 is considered to be a leading edge 505 of dough piece 125, while the other half is considered to be a trailing edge 510 of dough piece. The designation of these edges is based on the direction in which dough piece 125 was traveling during formation, i.e., direction 105. Leading edge 505 is the edge at the front of dough piece 125 that is first cut by rotary cutter 120. Trailing edge 510 is the edge at the rear of dough piece 125 that is last cut by rotary cutter 120.

Dough piece 125 has a plurality of depressions 515. Specifically, lines 520-528 of depressions 515 extend from leading edge 505 to trailing edge 510. When second end 211 of rotary cutter 120 is coupled to support 130 and first end 210 is coupled to support 131, arcuate lines 520-522 of depressions 515 are formed by inner blades 221-223, straight lines 523-525 of depressions 515 are formed by inner blades 224-226, and arcuate lines 526-528 of depressions 515 are formed by inner blades 227-229.

Arcuate lines 520-522 are concentric with one another, and arcuate lines 526-528 are concentric with one another. However, none of arcuate lines 520-522 are concentric with any of arcuate lines 526-528. The center point of arcuate lines 520-522 and the center point of arcuate lines 526-528 are both located outside dough piece 125 (i.e., outside outer perimeter 500). To illustrate this point, a center point 530 of arcuate lines 520-522 is shown in FIG. 5. In the embodiment illustrated, arcuate lines 520-522 and 526-528 are semicircular. However, other arcuate shapes can be used with the present invention. Straight lines 523-525 are parallel with one another, with straight line 524 bisecting dough piece 125.

Figure 6:
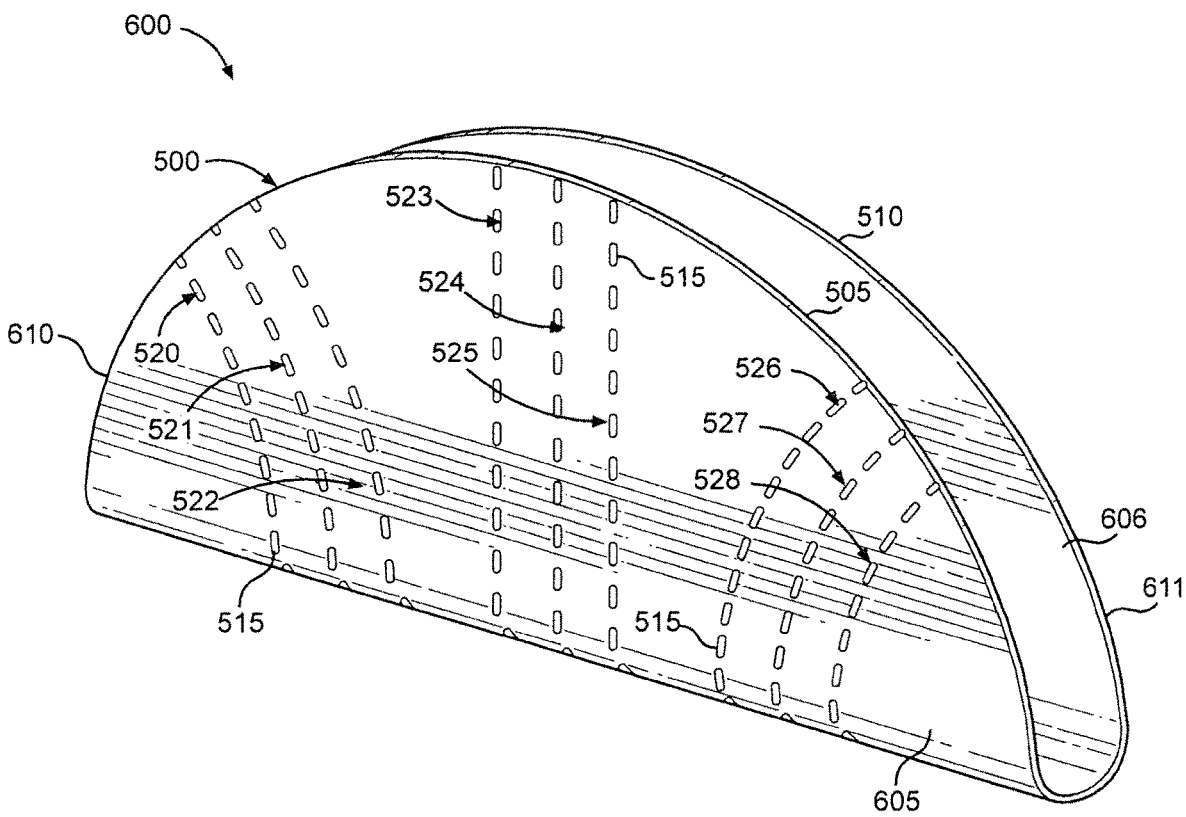
FIG. 6 is a perspective view of a taco shell formed from the piece of dough.

After dough piece 125 is cut from dough sheet 100 and depressions 515 are formed, dough piece 125 is folded along a line perpendicular to straight lines 523-525 to form a U-shaped dough piece (not shown), with depressions 515 located on the exterior. Depressions 515 can extend partially through dough piece 125, or fully therethrough so the depressions 515 actually define perforations. Next, the U-shaped dough piece is baked to produce a taco shell that retains the "U" shape. At this point, it should be recognized that the dough piece could take other shapes depending on the mold (not shown) used to hold the piece during the cooking process. Most notably, the dough piece could be shaped to produce a flat bottom taco shell. In any case, the U-shaped taco shell is shown in FIG. 6, where it is labeled with reference numeral 600. Taco shell 600 has a first sidewall 605 and a second sidewall 606. Taco shell 600 also has a first end 610 and a second end 611 that are spaced from one another along the longitudinal axis of taco shell 600.

Lines 520-528 extend up sidewall 605. Although not visible in FIG. 6, it should be understood, based on the foregoing description, that lines 520-528 also extend up sidewall 606. Accordingly, when a consumer bites end 611, for example, taco shell 600 tends to break along one of lines 526-528, with the particular line depending on the size of the bite. This is because the presence of depressions 515 weakens sidewalls 605 and 606. Without depressions 515, taco shell 600 might break at a location relatively far from where it was bitten, resulting in a messy eating experience in which fillings fall out of taco shell 600. As the consumer continues eating taco shell 600, taco shell 600 will break at other of lines 520-528 close to the location where taco shell 600 was bitten, which minimizes the tendency of the fillings to fall out.

Figure 7:
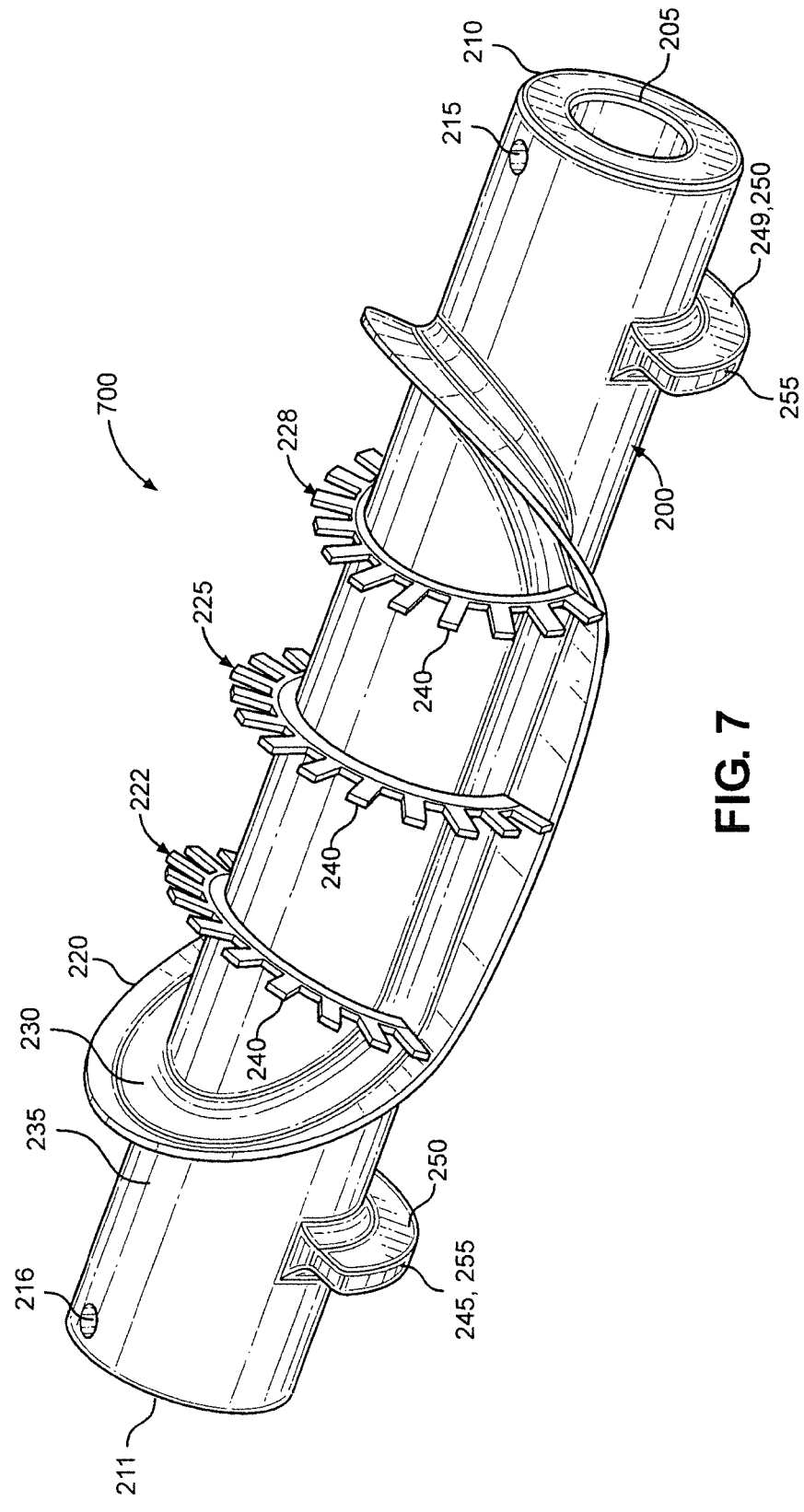
FIG. 7 is a perspective view of a rotary cutter constructed in accordance with another embodiment of the invention.
Figure 8:
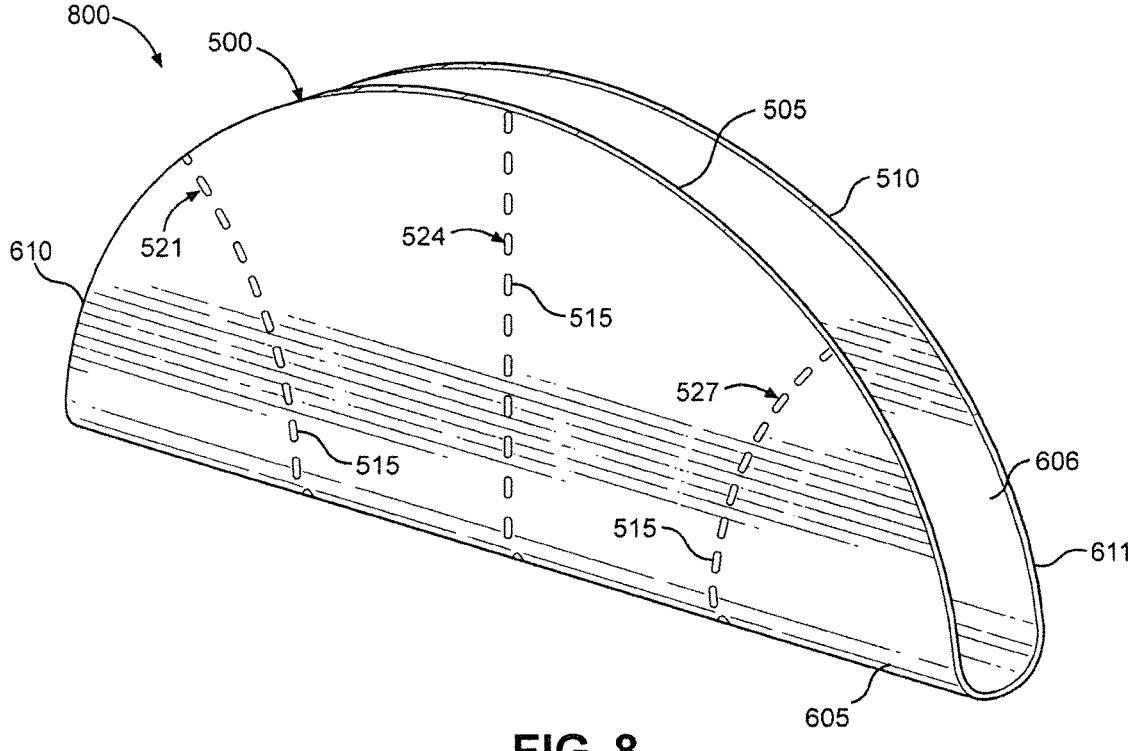
FIG. 8 is a perspective view of a taco shell formed using the rotary cutter of FIG. 7.

While rotary cutter 120 has nine inner blades 221-229 and taco shell 600 has nine corresponding lines 520-528 of depressions 515, it should be recognized that more or fewer lines of depressions can be provided and that such lines can be provided at locations other than those illustrated. As one example, FIG. 7 shows a rotary cutter 700, which differs from rotary cutter 120 only in that inner blades 221, 223, 224, 226, 227 and 229 have been omitted. Since the remaining structure is the same (and is labeled with the same reference numerals), it will not be discussed in detail. FIG. 8 shows a taco shell 800 created using rotary cutter 700. Accordingly, taco shell 800 differs from taco shell 600 only in that lines 520, 522, 523, 525, 526 and 528 are no longer present. The remaining structure is the same (and is labeled with the same reference numerals). As such, it will not be discussed in detail.

In general, it should be understood that the present invention provides for a hard taco shell comprising a first sidewall, a second sidewall, a first set of depressions and a second set of depressions, as shown in FIGS. 6 and 8. The first set includes at least one line of depressions, and each line of depressions extends up both the first and second sidewalls. The second set also includes at least one line of depressions, with each line of depressions extending up both the first and second sidewalls. The first set is located between a first end of the hard taco shell and a midpoint of the hard taco shell, while the second set is located between a second end of the hard taco shell and the midpoint. The first end, second end and midpoint are spaced from one another along a longitudinal axis of the hard taco shell. The hard taco shell further comprises a first region, free of depressions, between the first set and the midpoint. A second region, free of depressions, is provided between the second set and the midpoint. The first and second regions are sized such that the first and second sets appear as distinct groups of depressions. As shown in FIG. 8, each of the first and second sets can include a single line of depressions. Alternatively, as shown in FIG. 6, each of the first and second sets can include multiple lines of depressions. FIG. 6 also illustrates that the width of the first region is greater than the spacing between the lines of depressions of the first set. Similarly, the width of the second region is greater than the spacing between the lines of depressions of the second set. The hard taco shell can further comprise a third set of depressions, as shown in FIGS. 6 and 8. The third set includes at least one line of depressions, and each line of depressions extends up both the first and second sidewalls. The third set is located between the first and second regions.

Based on the above, it should be readily apparent that the present invention provides a taco shell that minimizes the tendency of the fillings to fall out during consumption, as well as an apparatus and method for producing the taco shell. While certain preferred embodiments of the present invention have been set forth, it should be understood that various changes or modifications could be made without departing from the spirit of the present invention. In general, the invention is only intended to be limited by the scope of the following claims.

The invention claimed is:

1. A hard taco shell comprising:
   a first sidewall;
   a second sidewall;
   a base interconnecting the first and second sidewalls;
   a first end;
   a second end;
   a first arcuate line of depressions extending up both the first and second sidewalls at a predetermined location spaced further from the second end than the first end wherein, the hard taco shell is configured to break along a predetermined break line defined by the first arcuate line of depressions when the first end of the hard taco shell is bitten; a second arcuate line of depressions extending up both the first and second sidewalls; and a straight line of depressions extending up both the first and second sidewalls.

2. The hard taco shell of claim 1, wherein the straight line of depressions is intermediate the first and second arcuate lines of depressions.

3. The hard taco shell of claim 1, wherein the first arcuate line also extends across the base.

4. The hard taco shell of claim 3, wherein the hard taco shell is U-shaped.

5. The hard taco shell of claim 1, wherein the first arcuate line of depressions also extends across the base.

6. The hard taco shell of claim 1, wherein the first arcuate line of depressions is formed from a series of depressions spaced across both the first and second sidewalls, with the series of depressions including at least three, non-linearly aligned depressions in each of the first and second sidewalls.

7. A hard taco shell having a first end, a second end and a midpoint which are spaced from one another along a longitudinal axis of the hard taco shell, said hard taco shell comprising:

a first sidewall;

a second sidewall;

a first arcuate line of depressions extending up both the first and second sidewalls;

a second arcuate line of depressions extending up both the first and second sidewalls, with the first arcuate line of depressions being located entirely between the first end of the hard taco shell and the midpoint of the hard taco shell, and the second arcuate line of depressions being located entirely between the second end of the hard taco shell and the midpoint of the hard taco shell, wherein, when the hard taco shell is bitten from one of the first and second ends, the hard taco shell is configured to break along a predetermined break line defined by one of the first and second arcuate lines of depressions; and a straight line of depressions extending up both the first and second sidewalls.

8. The hard taco shell of claim 7, further comprising:

a first region, free of depressions, encompassing an entire area between the first arcuate line of depressions and the midpoint; and a second region, free of depressions, encompassing an entire area between the second arcuate line of depressions and the midpoint.

9. The hard taco shell of claim 7, wherein the first arcuate line of depressions appears as a distinct group of depressions from the second arcuate line of depressions.

10. The hard taco shell of claim 7, wherein the straight line of depressions extends through the midpoint.

11. The hard taco shell of claim 7, further comprising an entire area, free of depressions, between the first arcuate line of depressions and the straight line of depressions.

12. The hard taco shell of claim 7, further comprising an entire area, free of depressions, between the first end and the first arcuate line of depressions.

13. A method of producing a hard taco shell comprising:

cutting a dough piece from a dough sheet;

creating a first arcuate line of depressions, a second arcuate line of depressions and a straight line of depressions in the dough piece;

folding the dough piece to form a shaped dough piece having spaced first and second sidewalls; and baking the shaped dough piece to produce the hard taco shell having the first arcuate line of depressions extending up both the first and second sidewalls, the second arcuate line of depressions, the straight line of depressions intermediate the first and second arcuate lines of depressions, and a first region, free of depressions, encompassing an entire area between the first arcuate line of depressions and the straight line of depressions.

14. The method of claim 13, wherein folding the dough piece includes folding the dough piece so that the second arcuate line of depressions extends up both the first and second sidewalls.

15. The method of claim 13, wherein folding the dough piece includes folding the dough piece so that the straight line of depressions extends up both the first and second sidewalls.

16. The method of claim 13, wherein creating the straight line of depressions includes creating the straight line of depressions such that the straight line of depressions extends from a leading edge of the dough piece to a trailing edge of the dough piece.

17. The method of claim 13, wherein creating the first arcuate line of depressions includes creating the first arcuate line of depressions such that the first arcuate line of depressions extends from a leading edge of the dough piece to a trailing edge of the dough piece.

* * * * *